US007085896B2

(12) United States Patent
Bianchi et al.

(10) Patent No.: US 7,085,896 B2
(45) Date of Patent: Aug. 1, 2006

(54) METHOD AND APPARATUS WHICH IMPLEMENTS A MULTI-PORTED LRU IN A MULTIPLE-CLOCK SYSTEM

(75) Inventors: Andrew James Bianchi, Austin, TX (US); Jose Angel Paredes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/427,135

(22) Filed: Apr. 30, 2003

(65) Prior Publication Data

US 2004/0221108 A1 Nov. 4, 2004

(51) Int. Cl.
*G06F 12/00* (2006.01)

(52) U.S. Cl. ............... 711/136; 711/134; 711/141; 711/133; 711/118; 711/128

(58) Field of Classification Search ............... None
See application file for complete search history.

(56) References Cited

U.S. PATENT DOCUMENTS 6,453,387 B1 * 9/2002 Lozano ............... 711/133

\* cited by examiner

*Primary Examiner*—Mano Padmanabhan
*Assistant Examiner*—Mardochee Chery
(74) *Attorney, Agent, or Firm*—Casimer K. Salys; Dillon & Yudell LLP

(57) ABSTRACT

An apparatus for implementing a least-recently used (LRU) mechanism in a multi-port cache memory includes an LRU array and a shift decoder. The LRU array has multiple entries. The shift decoder includes a shifting means for shifting the entries within the LRU array. The shifting means shifts a current one of the entries and adjacent entries once, and loading new address, in response to a single cache hit in the current one of the entries. The shifting means shifts a current one of the entries and adjacent entries once, and loading an address of only one of multiple requesters into the most-recently used (MRU) entry, in response to multiple cache hits in the current one of the entries. The shifting means shifts all subsequent entries, including the current entries, n times, and loading addresses of all requesters contributed to the multiple cache hits in consecutive entries into the MRU entry and subsequent entries, in response to multiple cache hits in consecutive entries. The shifting means shifts some of the entries n times, some of the entries n−1 times, etc., and loading addresses of all requesters that have a cache hit in the multiple cache hits into the MRU entry and subsequent entries, in response to multiple cache hits not in the same entry or consecutive entries.

14 Claims, 11 Drawing Sheets

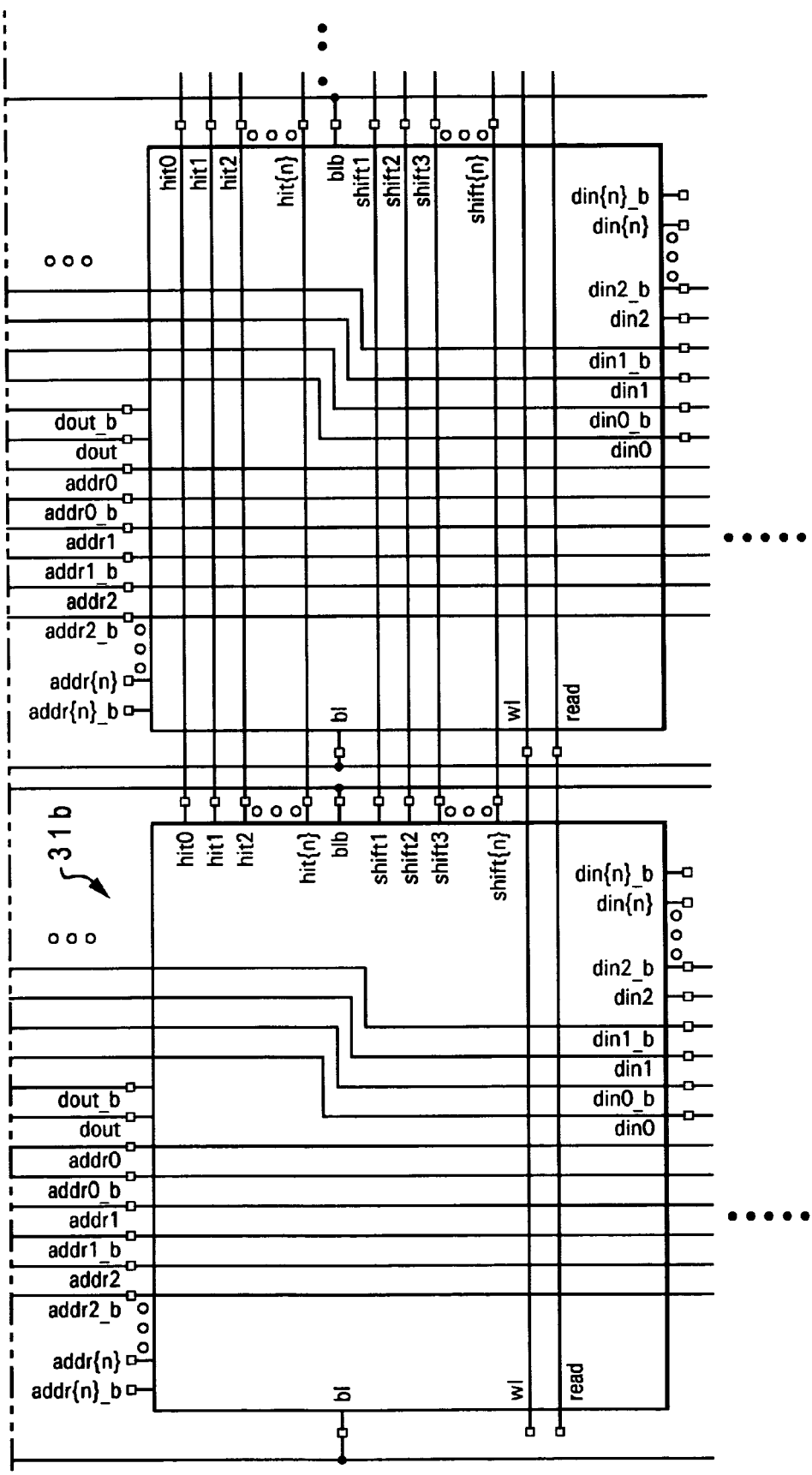
Fig. 3a(1)

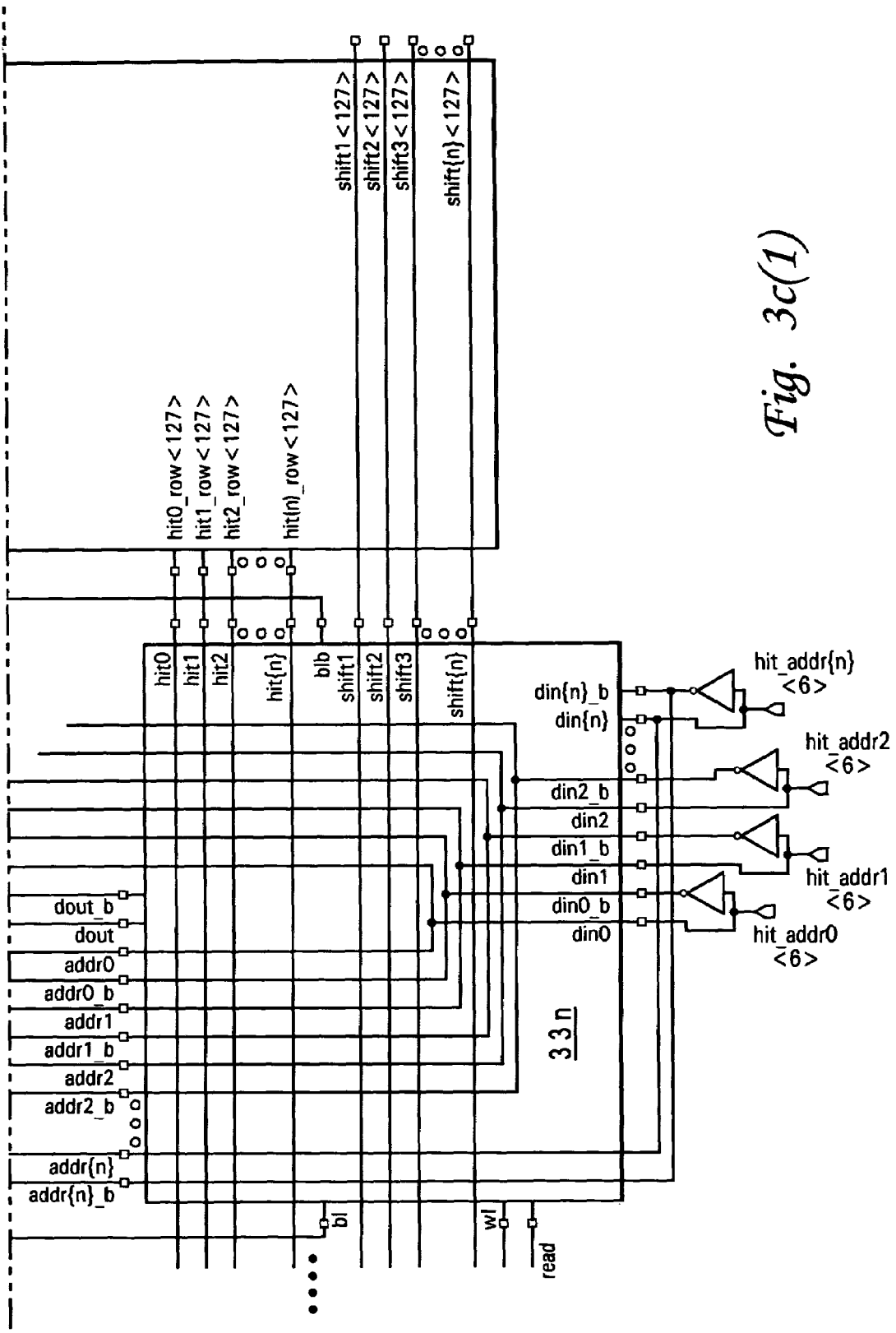
Fig. 3c(1)

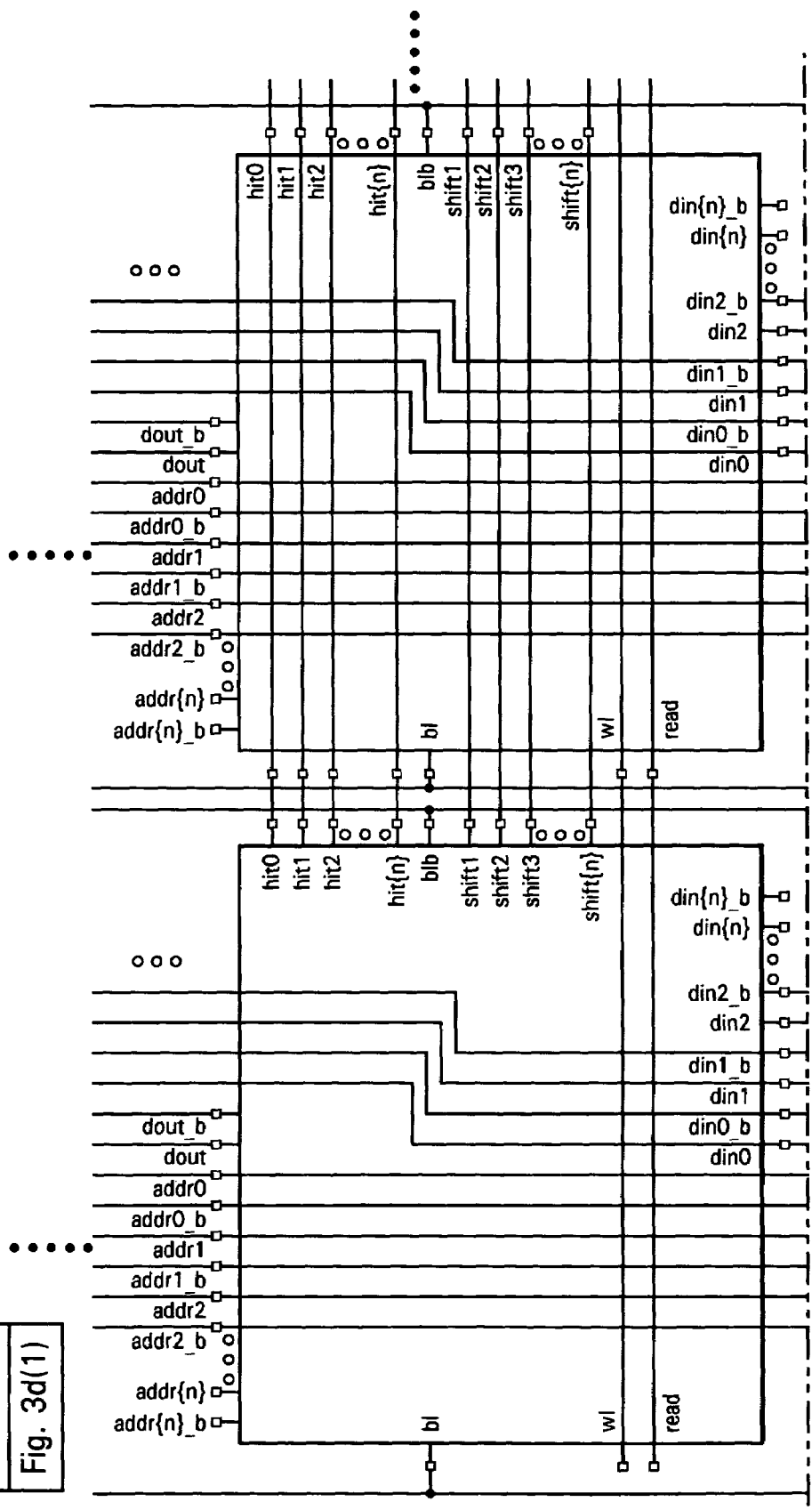

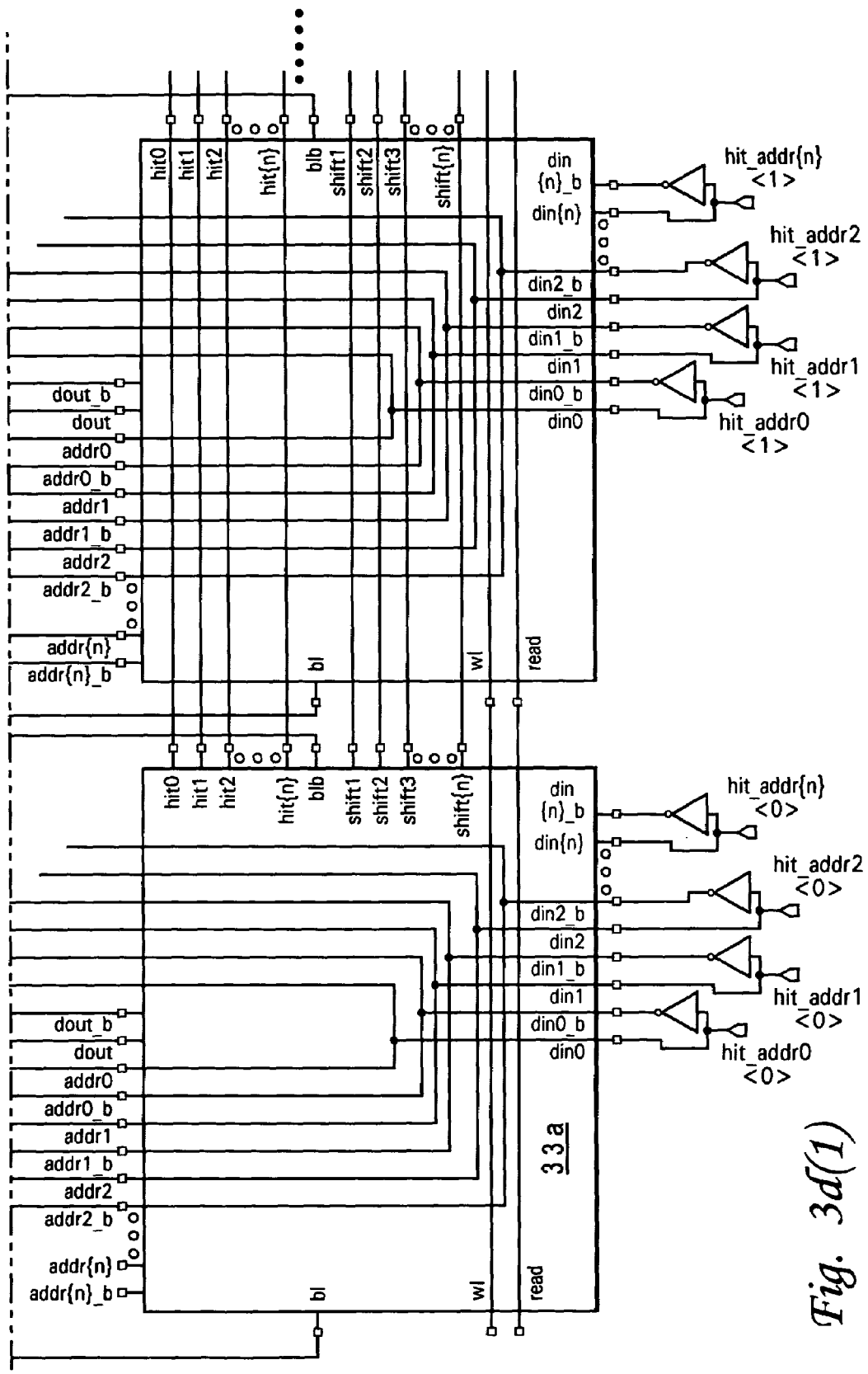
Fig. 3d(1)

METHOD AND APPARATUS WHICH IMPLEMENTS A MULTI-PORTED LRU IN A MULTIPLE-CLOCK SYSTEM

BACKGROUND OF THE INVENTION

1. Technical Field

The present invention relates to cache memories in general, and, in particular, to an apparatus for implementing a Least-Recently Used (LRU) cache line replacement scheme in a cache memory. Still more particularly, the present invention relates to an apparatus for implementing an LRU cache line replacement scheme in a multi-port cache memory within a data processing system.

2. Description of the Related Art

A data processing system typically includes both a system memory and a cache memory. A cache memory is a small and relatively high-speed memory interposed between a processor and the system memory. Information such as data or instructions may be copied from a portion of the system memory into the cache memory so that the information will be available to the processor in a relatively short amount of time when the requested information resides in the cache memory.

However, if the information requested by the processor cannot be found in the cache memory (i.e., a cache miss), the requested information must be obtained from the system memory. After the information has been obtained from the system memory, a copy of the information may also be placed in the cache memory for future usage, in addition to the immediate usage by the processor. Thus, when all possible storage locations for the information within the cache memory are completely filled, some of the information already stored in the cache memory has to be replaced by the new information via an operation known as linefill. Needless to say, it is important to have a strategy to decide what specific information already stored in the cache memory needs to be discarded in order to make room for the new information. Generally speaking, a Least-Recently Used (LRU) replacement scheme is typically employed to select a cache line to be replaced after a cache miss. This is because statistical data have shown that for low associativity caches (caches that are configured as four-way set associative or less), an LRU type of replacement scheme can best minimize the cache miss ratio when compared to other cache replacement schemes such as random replacement or round-robin.

It is difficult to implement an LRU cache line replacement mechanism for a multi-port cache memory because the updating algorithm must be able to take into account all concurrent cache requests as well as the current state of the LRU cache line. The present disclosure provides an apparatus for implementing an LRU cache line replacement scheme in a multi-port cache memory within a data processing system.

SUMMARY OF THE INVENTION

In accordance with a preferred embodiment of the present invention, an apparatus for implementing a least-recently used (LRU) cache replacement scheme in a multi-port cache memory includes an LRU array and a shift decoder. The LRU array has multiple entries. The shift decoder includes a shifting means for shifting the entries within the LRU array. The shifting means shifts a current one of the entries and adjacent entries once, and loading new address, in response to a single cache hit in the current one of the entries. The shifting means shifts a current one of the entries and adjacent entries once, and loading an address of only one of multiple requesters into the most-recently used (MRU) entry, in response to multiple cache hits in the current one of the entries. The shifting means shifts all subsequent entries, including the current entries, n times, and loading addresses of all requesters contributed to the multiple cache hits in consecutive entries into the MRU entry and subsequent entries, in response to multiple cache hits in consecutive entries. The shifting means shifts some of the entries n times, some of the entries n−1 times, etc., and loading addresses of all requesters that have a cache hit in the multiple cache hits into the MRU entry and subsequent entries, in response to multiple cache hits not in the same entry or consecutive entries.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 3a–3d are block diagrams of an LRU array coupled to a shifter decoder within the cache memory from FIG. 2, in accordance with a preferred embodiment of the present invention.

DETAILED DESCRIPTION OF A PREFERRED EMBODIMENT

The present invention may be implemented in a variety of processors having at least one cache memory. The processor may be, for example, a reduced instruction set computer (RISC) processor or a complex instruction set computer (CISC) processor. For the purpose of illustration, a preferred embodiment of the present invention, as described below, is implemented in a RISC processor having a multi-port cache memory.

Figure 1:
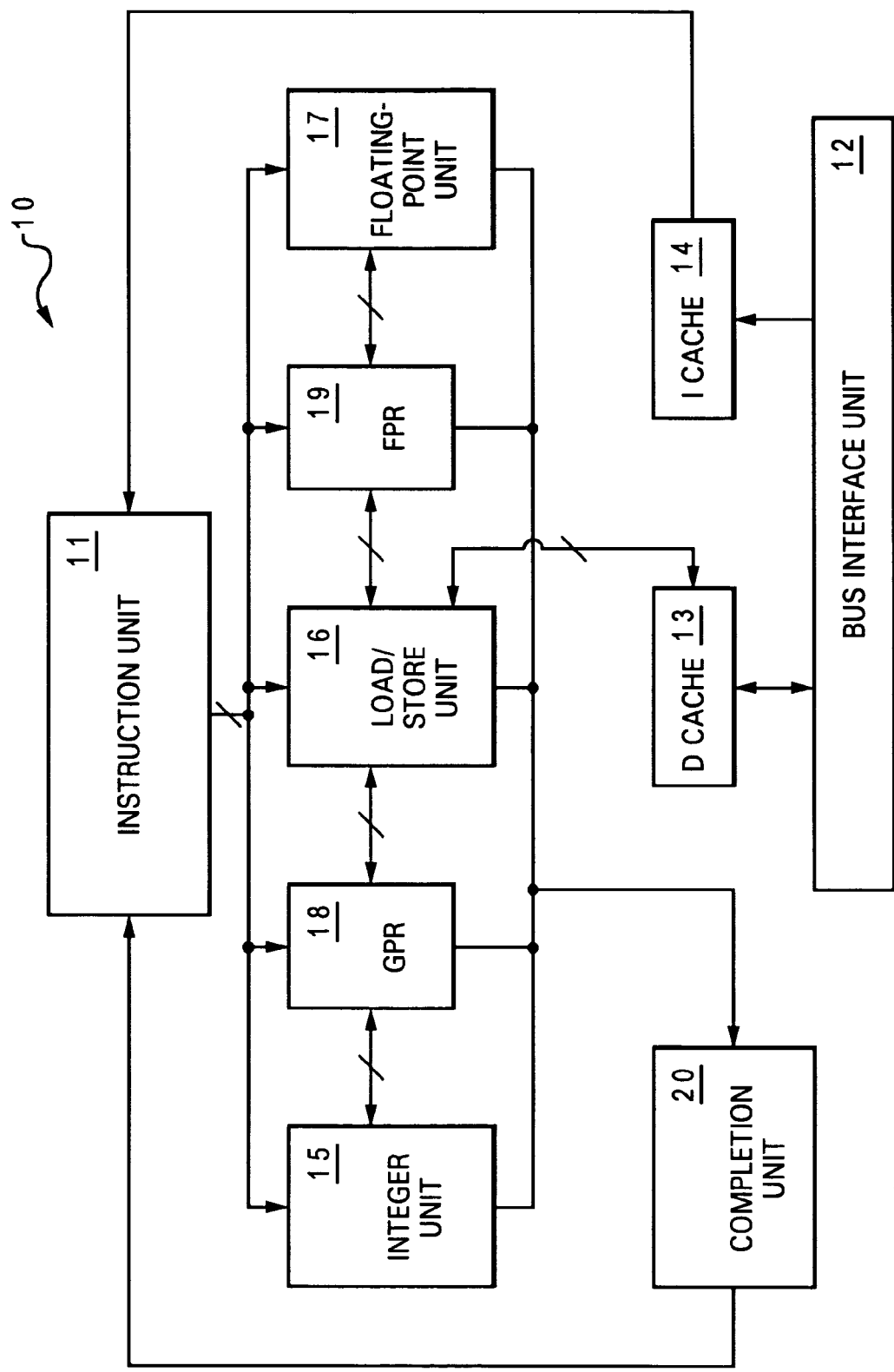
FIG. 1 is a block diagram of a processor in which a preferred embodiment of the present invention is incorporated.

Referring now to the drawings and in particular to FIG. 1, there is depicted a block diagram of a processor in which a preferred embodiment of the present invention is incorporated. Within a processor 10, a bus interface unit 12 is coupled to a data cache 13 and an instruction cache 14. Both data cache 13 and instruction cache 14 are high-speed two-port cache memories that enable processor 10 to achieve a relatively fast access time to a subset of data or instructions previously transferred from a system memory (not shown). Instruction cache 14 is further coupled to an instruction unit 11 that fetches instructions from instruction cache 14 during each execution cycle.

Processor 10 also includes three execution units, namely, an integer unit 15, a load/store unit 16, and a floating-point unit 17. Each of execution units 15–17 can execute one or more classes of instructions, and all execution units 15–17 can operate concurrently during each processor cycle. After execution has terminated, execution units 15–17 store data results to a respective rename buffer, depending upon the instruction type. Any one of execution units 15–17 may signal a completion unit 20 that the instruction unit has finished execution of an instruction. Instructions are completed in program order, and result data are transferred from the respective rename buffer to a general purpose register 18 or a floating-point register 19, accordingly.

Figure 2:
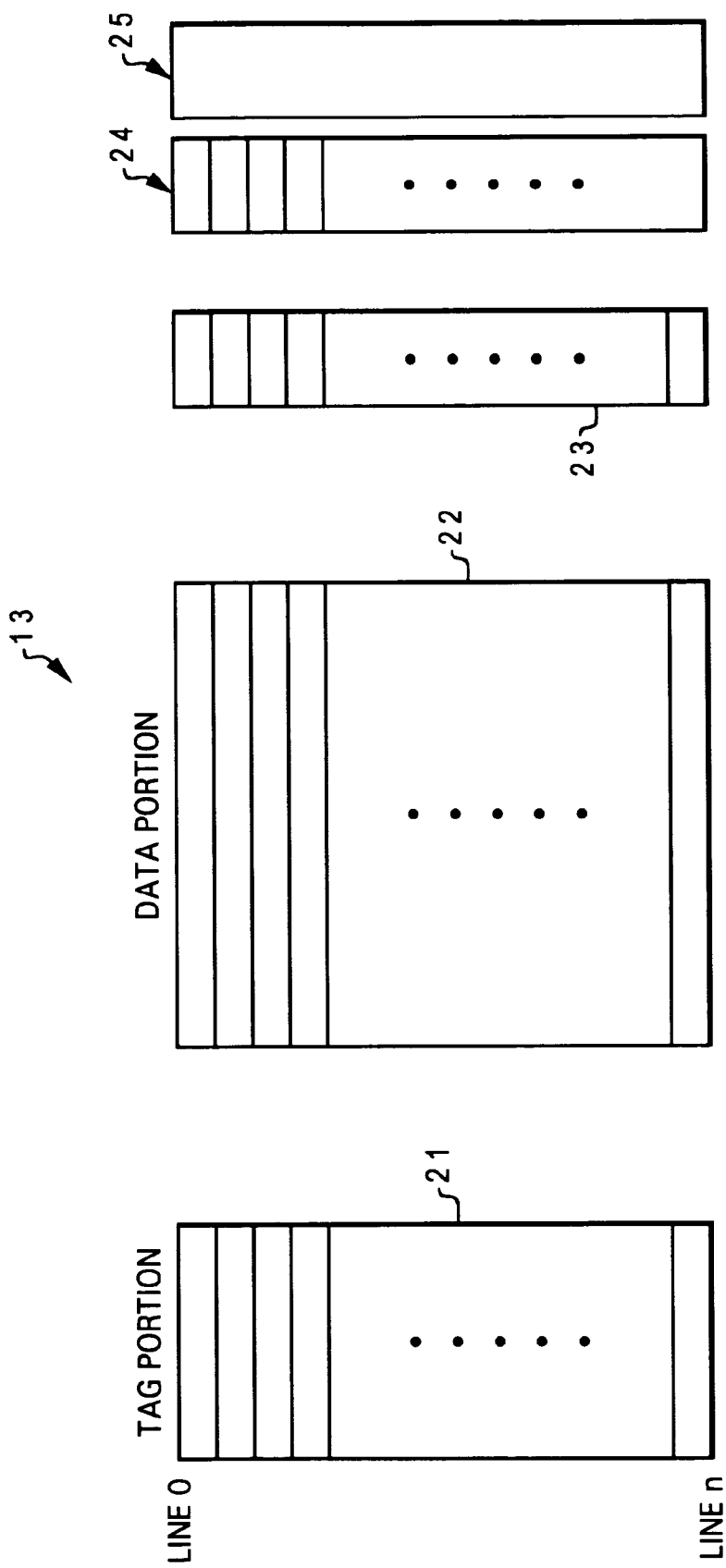
FIG. 2 is a block diagram of a cache memory within the processor of FIG. 1, in accordance with a preferred embodiment of the present invention.
Figure 3A:
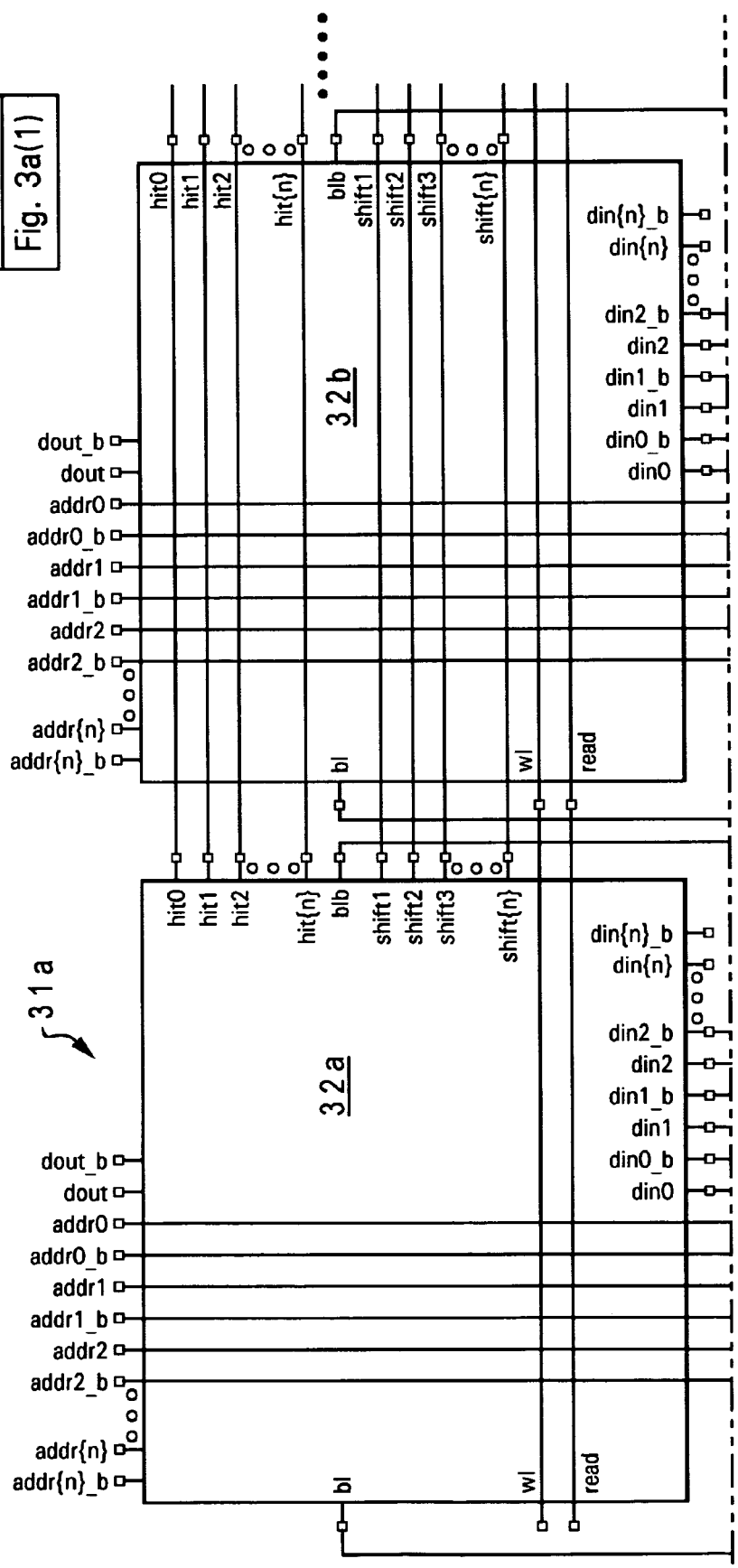
Figure 3B:
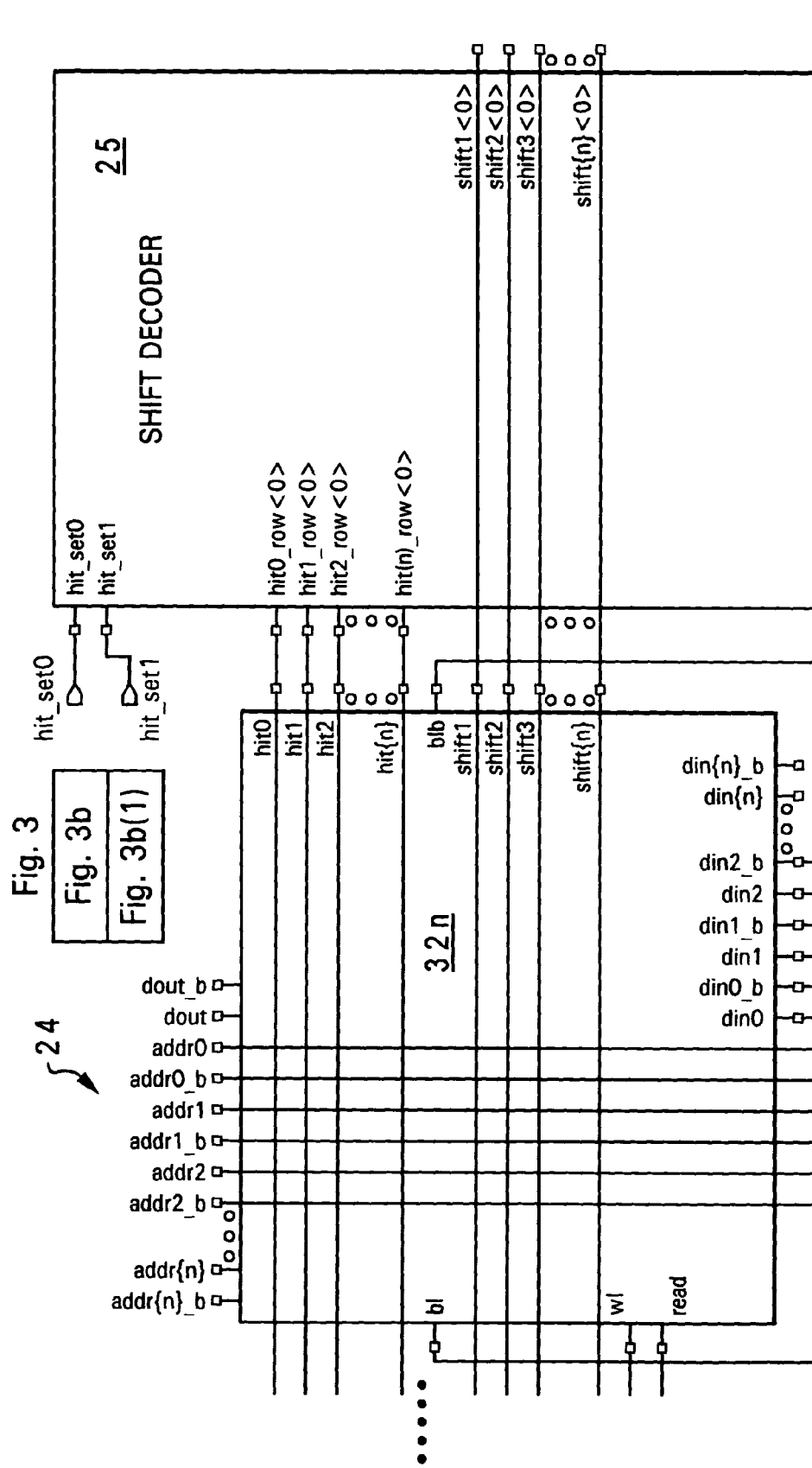
Figure 36:
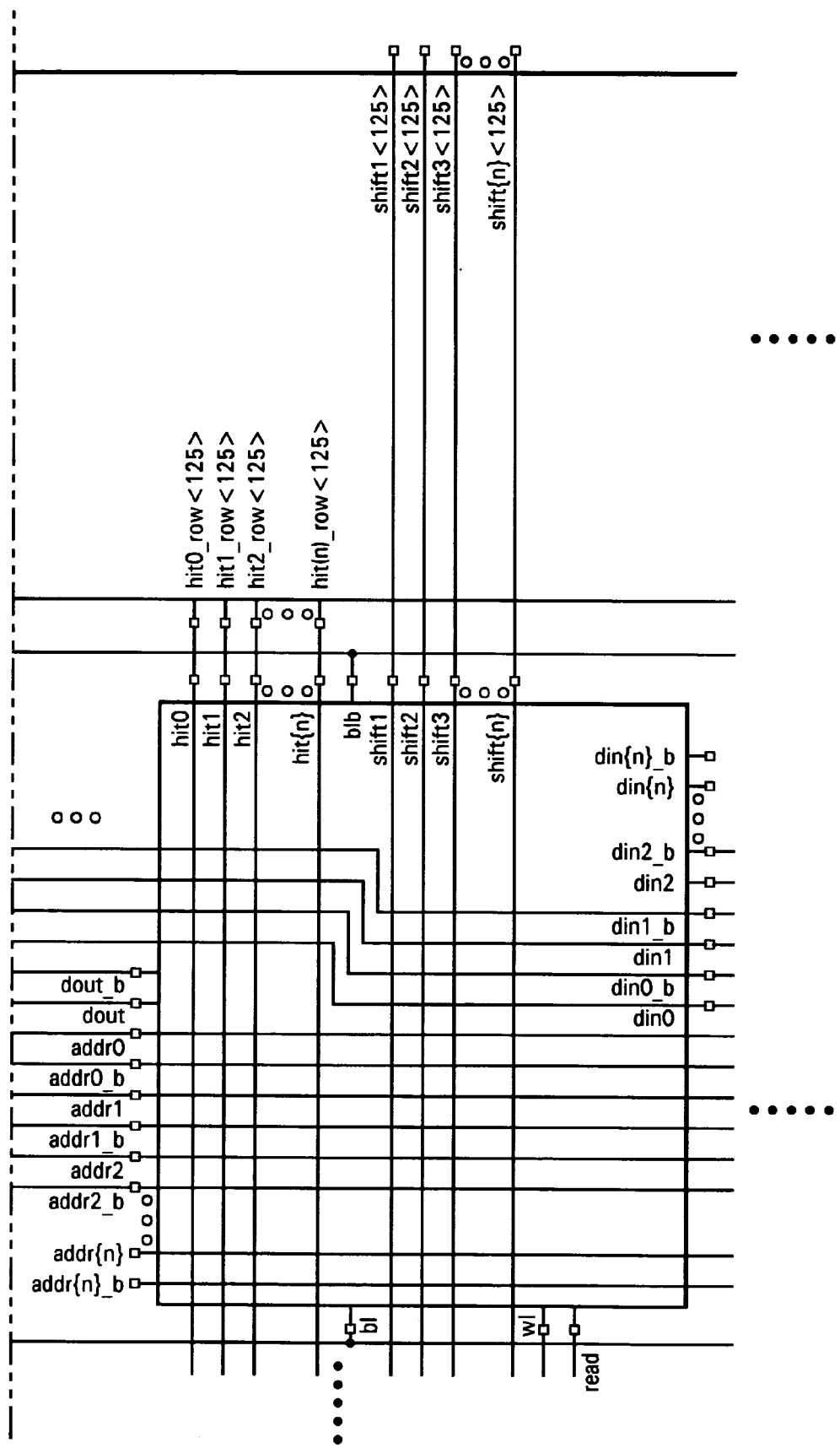
Figure 3C:
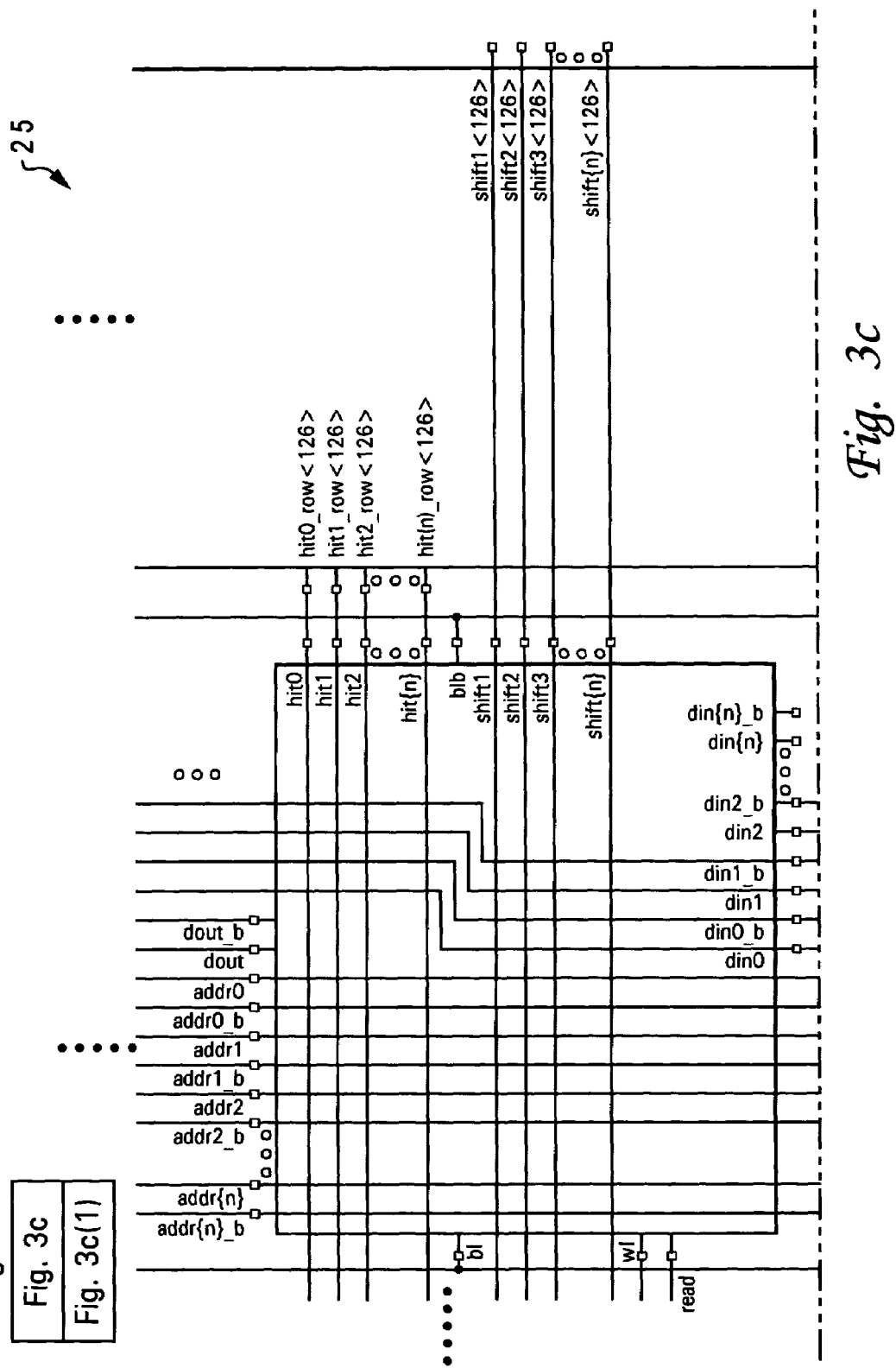

With reference now to FIG. 2, there is depicted a block diagram of the organization of data cache 13, in accordance with a preferred embodiment of the present invention. As shown, data cache 13 is configured as a direct-mapped cache. Each cache line within data cache 13 is divided into two portions, namely, a tag portion 21 and a data portion 22. Each entry in tag portion 21 corresponds to an entry in data portion 22. Each entry in data portion 22 contains actual data that may be required by a processing unit, such as integer unit 15, load/store unit 16 or floating-point unit 17 (from FIG. 1). Each entry in tag portion 21 contains an address tag that is utilized for comparison with a request address in order to determine whether there is a cache "hit" or "miss."

In addition to tag portion 21 and data portion 22, each cache line is also associated with several bits that are intended for various purposes. For example, each cache line may include a state bit field 23 having two state bits (not shown) for implementing the well-known MESI (modified, exclusive, shared, and invalid) protocol.

In order to implement an LRU cache line replacement mechanism for data cache 13, an LRU array 24 is utilized to track the state of utilization of cache lines within data cache 13. LRU array 24 includes an array of entries, each entry containing bits to represent a cache line within data cache 13. The state of utilization of a cache line can be determined by simply interrogating an entry of LRU array 24.

As shown in FIG. 2, LRU array 24 is coupled to a shift decoder 25. Shift decoder 25 determines which entry of LRU array 24 need to be shifted in response to one or more cache hit signals simultaneously. There are four cases of cache hit signals to consider, as follows:

case 1: single cache hit—shift current entry and adjacent entries once; load new address;
case 2: multiple cache hits in the same entry—shift current entry and adjacent entries once; load the address of only one of the requesters that has the cache hit;
case 3: multiple cache hits in consecutive entries—shift all following entries, including current entries n times; load addresses of all requesters that have a cache hit; and
case 4: multiple cache hits but not in the same entry or consecutive entries—shift some entries n times, some entries n–1 times, etc.; load addresses of all requesters that have a cache hit.

Referring now to FIGS. 3a–3d, there are depicted block diagrams of LRU array 24 coupled to shifter decoder 25, in accordance with a preferred embodiment of the present invention. As shown, LRU array 24 contains multiple entries, from an LRU entry 31a to a most-recently used (MRU) entry 31n. The number of entries in LRU array 24 equals the number of cache lines in data cache 13 (from FIG. 2). Each of the entries in LRU array 24 includes multiple cells, each cell represents one bit of the entry information. For example, LRU entry 31a includes cells 32a–32n and MRU entry 31n includes cells 33a–33n.

As shown, the hit_addr( ) signals are connected to a corresponding address ports of the cells to evaluate a compare signal. For example, the hit_addr0 line is connected to the din0 port of the bottom row and the din1 of the second to the bottom row. Also, the hit_addr1 is connected to the din1 port of the bottom row.

The shift signals for shifting entries 31a–31n in LRU array 24 are generated by shift decoder 25. Shift decoder 25 determines the rows that need to be shifted and generate the corresponding shift signals. The shift equations for an n-port i-entry LRU array 24 are as follows:

m = number of shifts
For i = 0 to number_of_LRU_entries–2
    shift1(i) = NOT shift{m}(i) AND NOT shift{m–1}(i) AND ... AND
        NOT shift2(i) AND {V(hit0(0 to i)) XOR V(hit1(0 to i))
        XOR ... XOR V(hit{n–1}(0 to i))]
    shift2(i) = NOT shift{m}(i) AND NOT shift{m–1}(i) AND ... AND
        NOT shift3(i) AND [V(hit0(0 to i+1) AND V(hit1(0 to i+
        1))] OR [V(hit0(0 to i+1)) AND V(hit2(0 to i+1))] OR ...
        OR [V(hit{n–2}(0 to i+1)) AND V(hit{n–1}(0 to i+1))]
    shift3(i) = NOT shift{m}(i) AND NOT shift{m–1}(i) AND ... AND
        NOT shift4(i) AND [V(hit0(0 to i+2)) AND V(hit1(0 to i+
        2)) AND V(hit2(0 to i+2))] OR [V(hit0(0 to i+2))
        AND V(hit2(0 to i+2)) AND V(hit3(0 to i+2))] OR ... OR
        [V(hit{n–3}(0 to i+2)) AND V(hit{n–2})(0 to i+2)) AND
        V(hit{n–1}(0 to i+2))]
...
    shift{m}(i)=V(hit0(0 to i+m–1)) AND V(hit1(0 to i+m–1)) AND ...
        AND V(hit{n–1}(0 to i+n–1))]
END
shift1(last_entry) = hit0
shift2(last_entry) = hit1 AND NOT hit0
shift3(last_entry) = hit2 AND NOT hit1 AND NOT hit0
...
shift{m}(last_entry) = hit{n–1} AND NOT hit{n–2} AND ... AND NOT hit0

The operation V(A) represents a bitwise logical OR of a vector A. The values V(hit0(0 to i) and V(hit0(0 to (i+1))) are needed for the shift outputs because an entry should not be updated if the entry below was hit, since it would incorrectly shift up an entry that needs to be replaced. The letter n represents the number of requesters to data cache 13. When a hit occurs in LRU array 24, the new entries are moved to the bottom of LRU array 24. In order to accomplish that, the shift signal for the bottom entries are generated based on the hit_set signals. If only one requester hits, the bottom entry receives the new entry and the second to bottom entry will be shifted. If there are two cache hits, the bottom entry receives the first requester's address, the second entry from the bottom entry receives the second requester's address, etc.

For the last entry, the hit_address1 is stored through the shift2 port and the hit_address0 is stored through the shift1 port. The second to last entry is store hit_address0 through the shift2 port, and the data from the last entry is stored through the shift1 port, etc.

When multiple requesters hit in the same LRU entry (as in case 4), the logic within shift decoder 25 must be able to prevent shifting more than once. This is accomplished by gating the hit signals from LRU array 24 with the hit set signals, as follows:

hit0(i) =    hit0_row(i) AND hit_set0
hit1(i) =    hit1_row(i) AND hit_set1 AND NOT hit_set0
hit2(i) =    hit2_row(i) AND hit_set2 AND NOT hit_set1 AND NOT hit_set0
...
hit{n}(i) =    hit{n}_row(i) AND hit_set{n} AND NOT hit_set{n–1}
    AND NOT hit_set{n–2} AND ... AND NOT hit_set0

According to the above-mentioned shift equations, if LRU array 24 has, for example, two-port i-entry, then the shift equations are as follows:

| | |
|---|---|
| shift1(i) = | NOT shift2(i) AND [V(hit0(0 to i)) XOR V(hit1(0 to i))] |
| shift2(i) = | V(hit0(0 to i+1)) AND V(hit1(0 to i+1)) |

Hence, for the specific case of a two-port four-entry LRU array where i=0 to 3, the shift equations are:

| | |
|---|---|
| shift1(0) = | NOT shift2(0) AND [hit0(0) XOR hit1(0)] |
| shift2(0) = | V(hit0(0 to 1)) AND V(hit1(0 to 1)) = [hit0(0) OR hit0(1)] AND [hit1(0) OR hit1(1)] |
| shift1(1) = | NOT shift2(1) AND [V(hit0(0 to 1)) XOR V(hit1(0 to 1))] = NOT shift2(1) AND [(hit0(0) OR hit0(1)) XOR (hit1(0) OR hit1(1))] |
| shift2(1) = | V(hit0(0 to 2)) AND V(hit1(0 to 2)) = [hit0(0) OR hit0(1) OR hit0(2)] AND [hit1(0) OR hit1(1) OR hit1(2)] |
| shift1(2) = | NOT shift2(2) AND [V(hit0(0 to 2)) XOR V(hit1(0 to 2))] = NOT shift2(2) AND [(hit0(0) OR hit0(1) OR hit0(2)) XOR (hit1(0) OR hit1(1) OR hit1(2))] |
| shift2(2) = | V(hit0(0 to 3)) AND V(hit1(0 to 3)) = [hit0(0) OR hit0(1) OR hit0(2) OR hit0(3)] AND [hit1(0) OR hit1(1) OR hit1(2) OR hit1(3)] |
| shift1(3) = | hit_set0 AND NOT hit_set1 |
| shift2(3) = | hit_set1 |

In the two-port LRU array, the shift signals are a combination of two cache hit signals in data cache 13 from two requesters. For case 1, a shift1 signal can be generated by XORing hit0 and hit1 signals. But if more than one entry in LRU array 24 has to be updated, then case 3 and 4 need to be considered. Some of the entries in LRU array 24 need to be shifted once and other entries need to be shifted multiple times. Because of case 3, the shift signals must also be based on the cache "hit" signal from the entries below. If two consecutive entries are hit, for example, hit(A and B), then both entries need a shift2 signal to be replaced. Entry A cannot be replaced with entry B but with the entry below entry B. Entry B is replaced with the second entry below entry B. Also, in the present case, the shift1 signal must also exclude the shift2 signal. Otherwise, the entry will try to load both ports that would cause a conflict in the data.

In the two-port four entry LRU array example, the address stored in entry 0 of LRU table 24 is the LRU address, and the address in entry 3 is the MRU address. The equations for the hit0 and hit1 signals are:

| | |
|---|---|
| hit0(i) = | hit0_row(i) AND hit_set0 |
| hit1(i) = | hit1_row(i) AND hit_set1 AND NOT hit_set0 |

The hit0_row(i) and hit1_row(i) signal for each entry i represent the case when the new address arriving to the LRU matches in that entry and port. For example, when a new address arriving on port 1 matches the address stored in entry 2, the hit1_row(2) signal is activated. The signals hit_set0 and hit_set1 come from the original cache and the signals represent what port the address hit on. These signals are added to cover case 2. If the same address arrives on both ports, then the shift2 signal will be activated for a single entry but only a shift1 is needed. So, the hit_set signals are added to eliminate this problem.

Also, the two new arriving addresses are stored in entries 3 and 2. If only one address arrives from port 1, then it is stored in entry 3 through the shift2 port and the address previously stored in entry 3 is now shifted to entry 2 through its shift1 port. Now, if two different addresses arrive, the address from port 1 will be stored in entry 3 and address from port 0 will be stored in entry 2 through its shift2 port.

Figure 4:
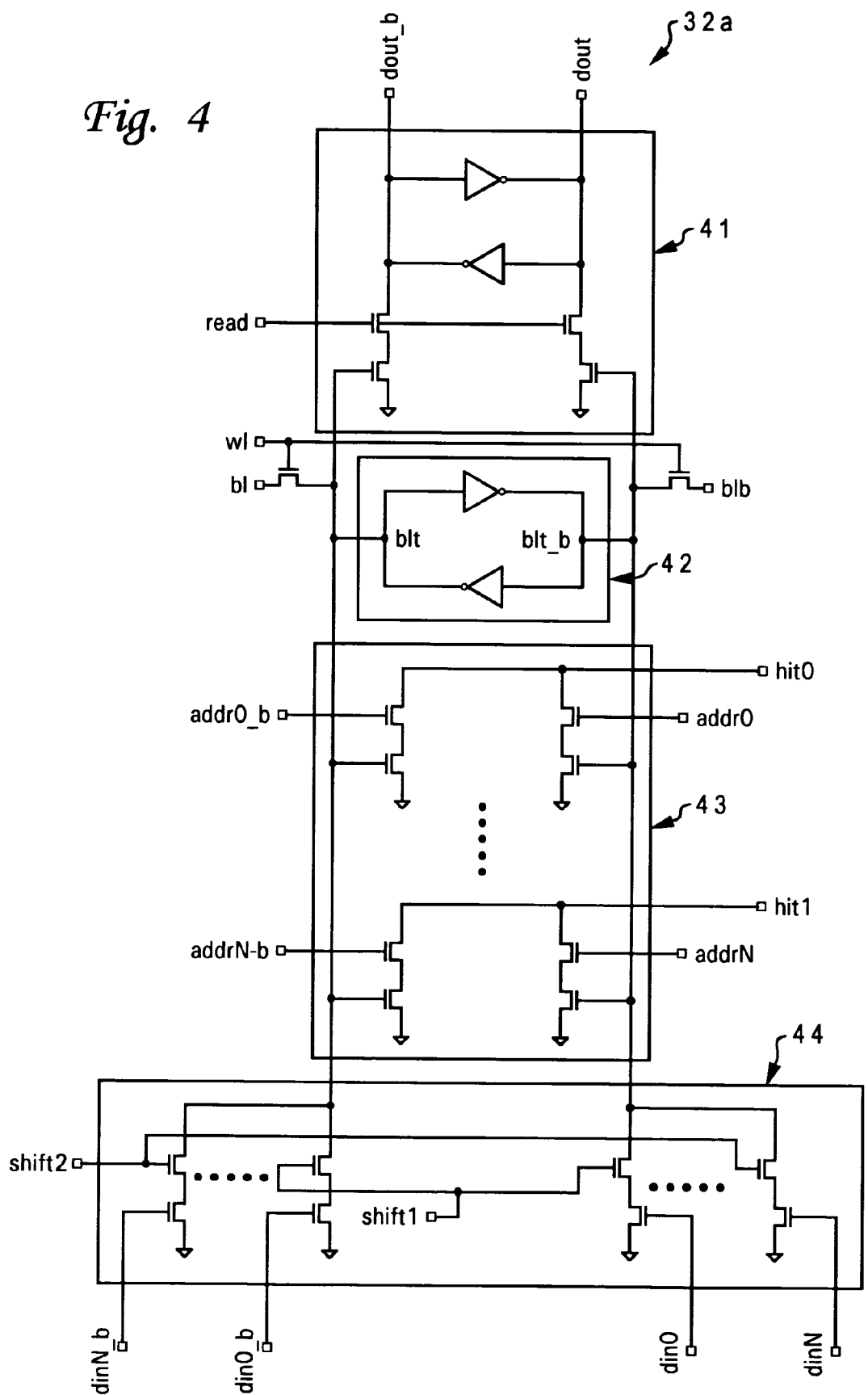
FIG. 4 is a circuit diagram of a cell within the LRU array from FIGS. 3a–3d, in accordance with a preferred embodiment of the present invention.

Since all the cells within LRLJ array 24 are substantially similar to each other, thus, only one of the cells is further described in details. With reference now to FIG. 4, there is illustrated a circuit diagram of cell 32a within LRU array 24, in accordance with a preferred embodiment of the present invention. As shown, cell 32a includes a slave node 41, a master node 42, a content-addressable memory (CAM) 43 and shift parts 44. Master node 42, which includes two inverters, is utilized to store the current state of an LRU entry. Master node 42 can be updated through either shift polls 44 (that is controlled by inputs shift(1), shift(2), . . . , shift(m)) or a read/write port (that is controlled by a wordline). Slave node 41 is utilized to write to a muster node of a cell located in a next row. Slave node 41 is updated by master node 42 via a read signal. By guaranteeing that slave node 41 and master node 42 are not updated concurrently, the LRU entry is capable of accepting new data into master node 42 while supplying current data from slave node 41.

CAM 43 detects whether or not the address bit matches the contents within cell 32a. All the memories within CAM 43 are connected together to form a matchline. When all of the address bits match the cells in a row, the match signal stays high, signaling a match. This match signal is then gated with the hit_set signal, which is generated whenever there is a hit in data cache 13, to form the hit signal sent to shift decoder 25. Cell 32a operates by both comparing the address and then writes to slave node 41 in the same half cycle, writes to master node 42, through shift ports 44 that are controlled by shift decoder 25, in the next half cycle. The write pass gates, controlled by wordline, are connected to bitlines (i.e., b1 and b1b) and are required to initialize LRU array 24. For proper operations, all entries within LRU array 24 must be initialized to unique values.

As has been described, the present invention provides an apparatus for implementing an LRU cache line replacement scheme in a multi-port cache memory within a data processing system.

While the invention has been particularly shown and described with reference to a preferred embodiment, it will be understood by those skilled in the art that various changes in form and detail may be made therein without departing from the spirit and scope of the invention.

What is claimed is:

1. An apparatus for implementing a least-recently used (LRU) cache replacement scheme in a multi-port cache memory, said apparatus comprising:
   an LRU array having a plurality of entries; and
   a shift decoder, coupled to said LRU array, having
      means for shifting a current one of said entries and adjacent entries once, and loading new address, in response to a single cache hit in said current one of said entries;
      means for shifting a current one of said entries and adjacent entries once, and loading an address of only one of multiple requesters that has multiple cache hits in said current one of said entries, in response to said multiple cache hits in said current one of said entries;

means for shifting all subsequent entries, including said current entries, n times, and loading addresses of all requesters contributed to multiple cache bits in consecutive entries, in response to said multiple cache hits in consecutive entries; and means for shifting some of said entries n times, some of said entries n−1 times. and loading addresses of all requestors that have a cache hit in multiple cache bits but not in said same entry or consecutive entries, in response to said multiple cache hits not in said same entry or consecutive entries.

2. The apparatus of claim 1, wherein each of said plurality of entries includes a plurality of cells.

3. The apparatus of claim 2, wherein each of said plurality of cells includes a slave node, a master node, a content-addressable memory (CAM) and a plurality of shift ports.

4. The apparatus of claim 3, wherein said master node includes two cross-coupled inverters for storing a current state of an entry.

5. The apparatus of claim 4, wherein said master node is updated through either said plurality of shift ports or a read/write port.

6. The apparatus of claim 3, wherein said slave node writes to said master node of said cell located in a next one of said entries.

7. The apparatus of claim 6, wherein said slave node is updated by said master node via a read signal.

8. A method for implementing a least-recently used (LRU) cache replacement scheme in a multi-port cache memory, said method comprising:

providing an LRU array having a plurality of entries;

in response to a single cache hit in one entry, shifting a current entry and adjacent entries once; and loading new address;

in response to multiple cache hits in one entry, shifting a current entry and adjacent entries once, and loading an address of only one of multiple requesters that has said multiple cache hits in said entry;

in response to multiple cache bits in consecutive entries, shifting all following entries, including current entries, n times, and loading addresses of all requesters contributed to said multiple cache hits in consecutive entries; and in response to multiple cache hits but not in the same entry or consecutive entries, shifting some of said entries n times, some of said entries n−1 times, and loading addresses of all requesters that have a cache hit in said multiple cache hits not in the same entry or consecutive entries.

9. The method of claim 8, wherein said method further includes providing each of said plurality of entries with a plurality of cells.

10. The method of claim 9, wherein said method further includes providing each of said plurality of cells a slave node, a master node, a content-addressable memory (CAM) and a plurality of shift ports.

11. The method of claim 10, wherein said method further includes providing said master node having two cross-coupled inverters for storing a current state of an entry.

12. The method of claim 11, wherein said method further includes updating said master node through either said plurality of shift ports or a read/write port.

13. The method of claim 10, wherein said method further includes writing to said master node of said cell located in a next one of said entries by said master node.

14. The method of claim 13, wherein said method further includes updating said slave node by said master node via a read signal.

* * * * *